US010390307B2

United States Patent
Mendil et al.

(10) Patent No.: US 10,390,307 B2
(45) Date of Patent: Aug. 20, 2019

(54) PROCESS FOR CONTROLLING ELECTRICAL ENERGY FLUXES IN A SYSTEM FOR RADIO ACCESS TO A COMMUNICATION NETWORK, AND ASSOCIATED CONTROL DEVICE

(71) Applicant: COMMISSARIAT A L'ENERGIE ATOMIQUE ET AUX ENERGIES ALTERNATIVES, Paris (FR)

(72) Inventors: Mouhcine Mendil, Grenoble (FR); Antonio De Domenico, Grenoble (FR); Vincent Heiries, Saint-Jean-de-Moirans (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 95 days.

(21) Appl. No.: 15/583,004

(22) Filed: May 1, 2017

(65) Prior Publication Data

US 2017/0318538 A1    Nov. 2, 2017

(30) Foreign Application Priority Data

Apr. 29, 2016    (FR) ...................................... 16 53856

(51) Int. Cl.
    *H04W 52/02*    (2009.01)
    *H04M 19/08*    (2006.01)
    *H04W 24/02*    (2009.01)

(52) U.S. Cl.
    CPC ....... *H04W 52/0261* (2013.01); *H04M 19/08* (2013.01); *H04W 24/02* (2013.01); *Y02D 70/00* (2018.01)

(58) Field of Classification Search
    CPC ........ H02J 13/0006; H02J 3/00; H02J 7/0091; H02J 3/14; H02J 7/0063; H02J 2003/007;
(Continued)

(56) References Cited

U.S. PATENT DOCUMENTS 5,264,764 A * 11/1993 Kuang ..................... B60K 6/46
    180/65.245
2006/0284614 A1* 12/2006 Kim ....................... H02J 7/0029
    324/149

(Continued)

FOREIGN PATENT DOCUMENTS

WO    2015/107299 A1    7/2015

OTHER PUBLICATIONS

French Search Report and Written Opinion dated Jan. 4, 2017 issued in counterpart application No. FR1653856; w/ English partial translation and partial machine translation (13 pages).
(Continued)

*Primary Examiner* — Jung Liu
(74) *Attorney, Agent, or Firm* — Westerman, Hattori, Daniels & Adrian, LLP

(57) ABSTRACT

The radio access system (1) for the communication network includes a radio transceiver (2), a device for connecting to an electrical grid (6), an electrical energy production device (4) and a battery (5) for storing electrical energy produced by said production device (4) and for electrically powering the radio transceiver (2). According to the invention, a control device (100) determines an operating strategy for the battery (5) by optimizing an objective function (O) that associates a cost with a possible operating strategy for the battery (5) during a period of determined duration T and while respecting at least one constraint for protecting the battery (5) against accelerated ageing, and manages the incoming and outgoing flows of electrical energy of the battery (5) depending on the determined operating strategy.

21 Claims, 3 Drawing Sheets

(58) Field of Classification Search
CPC ........ H02J 2003/146; H02J 2007/0067; G01R 31/3651; G01R 31/3679; G05F 1/66; G05B 13/041; G05B 13/048; G05B 13/021; G05B 17/02; G05B 13/0265; G06Q 10/06313; G06Q 50/06; G06Q 10/06315; H01M 10/443; H01M 10/486
See application file for complete search history.

(56) References Cited

U.S. PATENT DOCUMENTS

| | | | | | |
|---|---|---|---|---|---|
| 2009/0319090 | A1* | 12/2009 | Dillon | | G06Q 10/04 700/291 |
| 2010/0191490 | A1* | 7/2010 | Martens | | G01R 31/3648 702/63 |
| 2010/0235008 | A1* | 9/2010 | Forbes, Jr. | | G06Q 10/00 700/291 |
| 2012/0041622 | A1* | 2/2012 | Hermann | | H01M 16/006 701/22 |
| 2013/0038289 | A1* | 2/2013 | Tse | | H02M 3/158 320/118 |
| 2013/0063096 | A1* | 3/2013 | Schaefer | | H01M 10/443 320/134 |
| 2014/0005852 | A1* | 1/2014 | Asghari | | G06F 1/26 700/295 |
| 2014/0070606 | A1* | 3/2014 | Gibeau | | B60L 11/1862 307/9.1 |
| 2014/0125284 | A1* | 5/2014 | Qahouq | | H02J 7/0065 320/118 |
| 2016/0332531 | A1* | 11/2016 | Chazal | | H01M 10/425 |
| 2017/0285111 | A1* | 10/2017 | Fife | | G05B 13/021 |
| 2017/0288455 | A1* | 10/2017 | Fife | | G05B 13/021 |

OTHER PUBLICATIONS

Leithon, Sun et al., "Energy Management Strategies for Base Stations Powered by the Smart Grid", IEEE Globecom 2013—Symposium on Selected Areas in Communications, pp. 2635-2640.
Niyato et al., "Adaptive Power Management for Wireless Base Stations in a Smart Grid Environment", IEEE Wireless Communications, vol. 19, No. 6, Dec. 2012, pp. 44-51.
Kaewpuang et al., "Decomposition of Stochastic Power Management for Wireless Base Station in Smart Grid", IEEE Wireless Communications Letters, vol. 1, No. 2, Apr. 2012, pp. 97-100.
Leithon, Lim et al., "Online Energy Management Strategies for Base Stations Powered by the Smart Gird", IEEE SmartGirdComm 2013 Symposium—Demand Side Management, Demand Response, Dynamic Pricing, pp. 199-204.

* cited by examiner

PROCESS FOR CONTROLLING ELECTRICAL ENERGY FLUXES IN A SYSTEM FOR RADIO ACCESS TO A COMMUNICATION NETWORK, AND ASSOCIATED CONTROL DEVICE

This application claims priority of French application No. FR1653826 filed Apr. 29, 2016, which is hereby incorporated by reference in its entirety.

TECHNICAL FIELD OF THE INVENTION

The invention is situated in the field of electrical energy management in a radio access system for a communication network. More particularly, it relates to a method for controlling flows of electrical energy within a radio access system for a communication network including a radio transceiver, a device for connecting to an electrical grid, an electrical energy production device and a battery for storing electrical energy produced by the production device and for electrically powering the radio transceiver.

STATE OF THE ART

Against the background of global warming, telecommunications operators are seeking to reduce the ecological footprint of mobile telecommunication networks. Among the various components of a mobile telecommunication network, the radio access network, which includes base stations, is the largest consumer of energy. Specifically, these base stations consume between 50% and 90% of the energy of a mobile network.

One known solution for reducing the ecological footprint of a mobile telecommunication network consists in electrically powering the base stations of the network, at least partially, from green or renewable energy, such as solar energy or wind energy. To this end, the radio access network incorporates photovoltaic panels and/or wind turbines intended to power the base stations with electrical energy.

Photovoltaic panels and wind turbines are sources of intermittent electrical energy production, as green or renewable energy is not available continuously. Its availability varies greatly over time and cannot be controlled. In order to mitigate the intermittent nature of such electrical energy production, it is known to add an electrical energy storage battery between the intermittent electrical energy source (photovoltaic panel or wind turbine) and the base station. The battery makes it possible to temporarily store the electrical energy produced by the intermittent source and to supply this electrical energy to the base station in a smoothed manner. Ultimately, it performs the role of a buffer for storing energy and supplying power.

FIG. 1 shows a system 1 including a base station 2 covering a small cell 3, a photovoltaic panel 4 and a battery 5. This system 1 is termed green small cell or GSC. It is connected to a smart electrical grid, or smart grid, 6 by means of a bidirectional connection enabling a bidirectional exchange of electrical energy between the electrical grid and the GSC 1. The GSC system 1 may thus purchase electrical energy from or sell electrical energy to the grid 6. An energy monitoring system 7, interposed between the GSC system 1 and the electrical grid 6, manages the energy flows (represented by the arrows F1 in FIG. 1) between the GSC system 1 and the electrical grid 6 on the basis of data and/or information originating from them (represented by the arrows F2 in FIG. 1).

The use of green energy to power base stations makes it possible to significantly reduce the $CO_2$ emissions of the mobile access network, and therefore to lessen its carbon footprint.

The following documents relate to energy management for GSC systems similar to the GSC system 1 shown in FIG. 1:

[1] J. Leithon, S. Sun, and T. J. Lim, "Energy Management Strategies for Base Stations Powered by the Smart Grid," in IEEE GLOBECOM, 2013.

[2] D. Niyato, X. Lu, and P. Wang, "Adaptive Power Management for Wireless Base Stations in a Smart Grid Environment," IEEE Wireless Communications, vol. 19, no. 6, pp. 44-51, 2012.

[3] R. Kaewpuang, D. Niyato, and P. Wang, "Decomposition of Stochastic Power Management for Wireless Base Station in Smart Grid," IEEE Wireless Communications Letters, vol. 1, no. 2, pp. 97-100, 2012.

[4] J. Leithon, T. J. Lim, and S. Sun, "Online Energy Management Strategies for Base Stations Powered by the Smart Grid," in IEEE SmartGridComm, 2013, pp. 199-204.

The intended goal in these various documents is to minimize the operational expenditure linked with the electrical energy consumption of the telecommunications operator by developing a strategy of purchasing and selling electricity between the GSC system and the smart electrical grid, over a determined duration. By taking into consideration the variation in the purchase and sale prices of electricity in the electrical grid 6, the electrical consumption of the base station and the production of electrical energy by the photovoltaic module, a strategy may be defined, in the GSC system, to:

consume electrical energy originating from the electrical grid when the purchase price of electricity from the grid 6 is low, and supply excess electrical energy produced by the photovoltaic module 4 and temporarily stored in the battery when the sale price of electricity to the grid is high.

The approaches proposed in documents [1] to [4] make it possible to manage the energy exchanges between the electrical grid and the GSC for the purpose of reducing energy expenditure. These approaches implement a high-level control of the flows of energy exchanged overall between the system including the base station, the battery and the photovoltaic module, and the smart electrical grid, and require previous knowledge of the evolution of the random variables of interest relating to the production, to the consumption and to the price of electrical energy. However, they are based on rough knowledge of the variable price of electricity, of the photovoltaic production and of the energy consumption of the base station, for example on mean profiles of solar irradiation "IS", of load or of consumption of electricity by the GSC "$CH_{GSC}$" and of the price of electricity "$Px_E$", as shown in FIG. 2 by way of illustrative example. This results in models that are either very complex, thereby requiring frequent updates and incurring high maintenance costs, or inadequate for realistically conveying the evolution of the environment, thereby resulting in a loss of performance. Furthermore, the sole aim of these energy management methods is to reduce the electricity bill of the telecommunications operator.

The present invention improves the situation by also seeking to preserve the lifetime of the battery.

SUBJECT OF THE INVENTION

To this end, the invention relates to a method for managing flows of electrical energy within a radio access system for a communication network including a radio transceiver, a device for connecting to an electrical grid, an electrical energy production device and a battery for storing electrical energy produced by said production device and for electrically powering the radio transceiver, characterized in that a control device determines an operating strategy for the battery by optimizing an objective function that associates a cost with a possible operating strategy for the battery during a period of determined duration T and while respecting at least one constraint for protecting the battery against accelerated ageing, and manages the incoming and outgoing flows of electrical energy of the battery depending on the determined operating strategy.

The method of the invention makes it possible both to achieve an objective of reducing the cost, for example in terms of energy or the environment, linked with the operation of the radio transceiver connected to the electrical grid and equipped with a battery and with an electrical energy production device (for example a photovoltaic or wind power device), and to maximize the lifetime of the battery.

The constraint(s) for protecting the battery against ageing may be:
- to impose that the state of charge of the battery belongs to a permitted range restricted by a lower bound of between 10% and 30%, advantageously between 15% and 25%, and an upper bound of between 75% and 95%, advantageously between 80% and 90%;
- to set a maximum rate of charge or discharge of the battery;
- to restrict the duration of disuse of the battery to a predefined maximum duration.

The set maximum rate of charge or discharge may be determined depending on the temperature of the battery and/or on the current state of charge of the battery.

The maximum duration of disuse of the battery may be determined depending on the temperature of the battery and/or on the current state of charge of the battery.

In a first embodiment, the objective function is a function that associates a price of electricity of the electrical grid (purchase price for an electricity consumer and/or sale price for an electricity producer) with a possible operating strategy for the battery during the period of determined duration T by integrating over time, over the determined duration T, the product
- of a price of electricity of the electrical grid that is applicable during an elementary duration $\Delta_t$, and
- the amount of electrical energy supplied by the electrical grid to the radio access system during said elementary duration $\Delta_t$, and the control device determines, by optimizing the objective function, an operating strategy for the battery that minimizes said price of electricity during the determined duration T.

Advantageously, the amount of electrical energy supplied by the electrical grid during an elementary duration $\Delta_t$ is determined by a mathematical operation
- of adding an amount of electrical energy consumed by the radio transceiver during the elementary duration $\Delta_t$ and an amount of electrical energy charged to the battery during the elementary duration $\Delta_t$, if said battery is charging over the elementary duration $\Delta_t$, and
- of subtracting an amount of electrical energy produced by the energy production device during the elementary duration $\Delta_t$ and an amount of electrical energy discharged from the battery if said battery is discharging over the elementary duration $\Delta_t$.

Again advantageously, the objective function O is defined by the equation:

$$O=\Sigma_{t=0}^{T} P_e(t) \cdot [[P_{BS}(t)+P_{Bat}(SOC(t),SOC(t+1))-P_{PV}(t)]\times\Delta_t], \text{where}$$

t and t+1 represent two successive instants separated by the elementary duration $\Delta_t$;

$P_e(t)$ represents the purchase price for a consumer of electricity supplied by the electrical grid (6) to the radio access system (1) at the instant t, or the sale price of electricity to the electrical grid by the radio access system (1);

$P_{PV}(t)$ represents the electric power produced by the production device (4) at the instant t;

$P_{BS}(t)$ represents the electric power consumed by the transceiver (2) at the instant t;

$P_{Bat}((SOC(t),SOC(t+1)))$ represents the electric power consumed, if it is positive, or produced, if it is negative, by the battery (5) at the instant t;

SOC(t) and SOC(t+1) represent the states of charge of the battery (5) at the instants t and t+1, respectively.

The optimization may be based on data on the evolution, over the period of determined duration T, of state variables relating to the electrical energy consumed by the radio transceiver, to the state of charge of the battery and to the (purchase and/or sale) price of electricity of the electrical grid, which is predicted on the basis of previous data on the evolution of said state variables over a past period. It may use an interior point method.

In a second embodiment, the optimization uses a stochastic method implementing a learning mechanism.

In one variant embodiment, the objective function associates a carbon footprint cost with a possible operating strategy for the battery, during a determined duration T, of the radio access system, and the optimization aims to minimize said carbon footprint over the duration T.

The invention also relates to a control device for a radio access system for a communication network including a radio transceiver, a device for connecting to an electrical grid, an electrical energy production device and a battery for storing electrical energy produced by said production device and for electrically powering the radio transceiver, characterized in that it comprises an optimization module intended to determine an operating strategy for the battery by optimizing an objective function that associates a cost with a possible operating strategy for the battery during a determined duration T while respecting at least one constraint for protecting the battery against ageing, and a module for managing the battery intended to control the incoming and outgoing flows of electrical energy of the battery depending on the determined operating strategy.

The invention also relates to a radio access system for a communication network including a radio transceiver, a device for connecting to an electrical grid, an electrical energy production device, a battery for storing electrical energy produced by said production device and for electrically powering the radio transceiver, and such a control device.

BRIEF DESCRIPTION OF THE DRAWINGS

The invention will be better understood with the aid of the following description of one particular embodiment of a method and of a system for managing flows of electrical energy within a radio access system for a telecommunications network according to the invention, with reference to the appended drawings, in which.

DETAILED DESCRIPTION OF PARTICULAR EMBODIMENTS OF THE INVENTION

It will be noted from the outset that, in the various figures, identical, analogous or corresponding elements bear the same references, unless specifically indicated otherwise.

Figure 1:
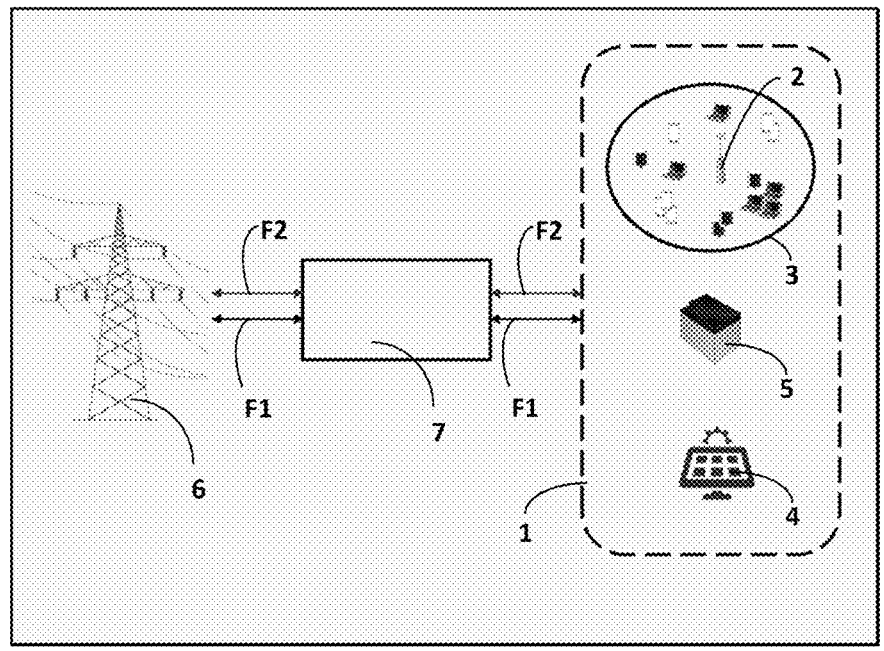
FIG. 1 shows an architecture including a GSC (green small cell) system connected to an electrical grid and an energy management entity, from the prior art.
Figure 2:
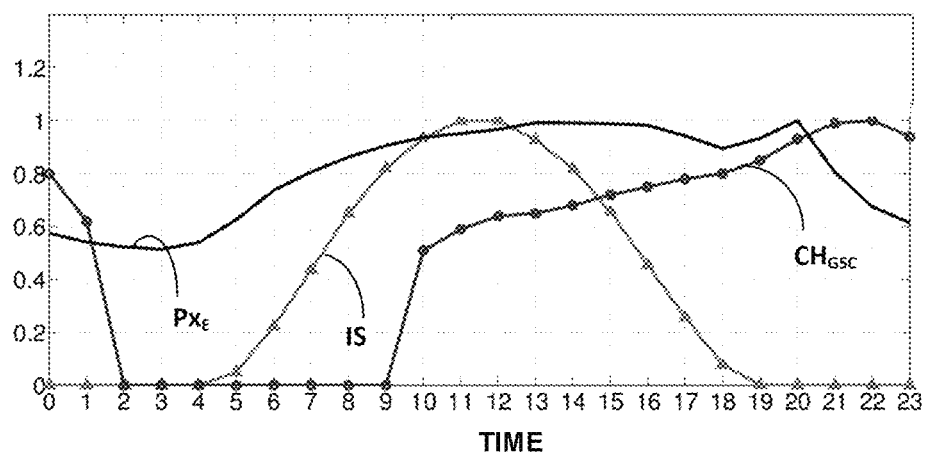
FIG. 2 shows normalized profiles of the temporal evolution, over a duration of 24 hours, of the sale price of electricity of the electrical grid, of the solar irradiation and of the load (or electrical consumption) of the GSC.
Figure 3:
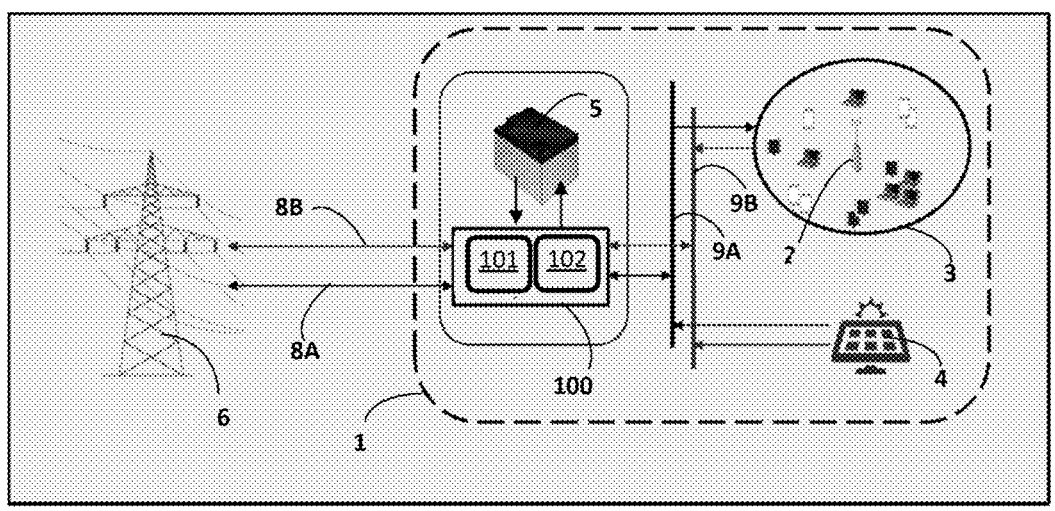
FIG. 3 shows an architecture including a GSC (green small cell) system connected to an electrical grid and an energy management entity, according to one particular embodiment of the invention.

FIG. 3 shows a radio access system 1 for a communication network, connected to a smart electrical grid 6. For example, the radio access system 1 belongs to the radio access portion or RAN (radio access network) of a mobile telephony network. However, the invention applies to the radio access portion of any other communication network.

The radio access system 1, also termed GSC (green small cell) system, comprises:
- a radio transceiver 2, or relay antenna, here a base station, covering a cell 3,
- an electrical energy production device 4, in the present case a photovoltaic device,
- an electrical energy storage battery 5,
- a control device 100.

The device 4 is intended to locally produce electrical energy on the basis of green energy, here solar energy. The device 4 could use another type of renewable energy, for example wind energy, to produce electricity.

The battery 5 is intended, on the one hand, to store the electrical energy produced by the device 4 and/or coming from the electrical grid 6, and, on the other hand, to supply electrical energy to the radio transceiver 2 and/or to the electrical grid 6.

The control device 100 incorporates a device for connecting to the electrical grid 6 (not shown in FIG. 3) that makes it possible to connect the radio access system 1 to the electrical grid 6 by means:
- of a link 8A for transporting incoming and outgoing flows of electrical energy, making it possible to bidirectionally exchange flows of electrical energy between the electrical grid 6 and the radio access system 1;
- of a link 8B for transporting data, making it possible to bidirectionally exchange data and/or information between the electrical grid 6 and the radio access system 1.

The control device 100 is also connected to the radio transceiver 2 and to the local electrical energy production device 4, here by means of a power bus 9A and of a data bus 9B enabling the transmission of flows of electrical energy and the transmission of data, respectively, between these various elements 100, 4 and 2. In FIG. 3, the arrows linking the elements—control device 100, base station 2 and electrical energy production device 4—to the power bus 9A and to the data bus 9B indicate the directions of the corresponding flows of data and of the corresponding flows of electrical energy.

Furthermore, the control device 100 is connected directly to the battery 5 and intended to manage the operation of the battery 5, in other words the incoming (or charging) flows of electrical energy and the outgoing (or discharging) flows of electrical energy of the battery 5. It has the role of directly controlling the battery 5.

With reference to FIG. 3, the various flows of electrical energy liable to flow within the radio access system 1 during operation will now be described.

The local production device 4 produces electrical energy intermittently, here depending on the insolation. The flow of electrical energy thus produced locally by the device 4 may be supplied to the battery 5 and stored in the latter at least temporarily.

During operation, the radio transceiver 2 consumes electrical energy. To this end, it receives a flow of electrical energy composed of one of or both of the following flows:
- a first flow of electrical energy originating from the electrical grid 6;
- a second flow of electrical energy originating from the battery 5.

The photovoltaic device 4 could directly provide a third flow of electrical energy to the radio transceiver 2 and/or to the electrical grid 6.

During operation, the battery 5 may, on the one hand, receive a flow of incoming electrical energy originating from the photovoltaic device 4 and/or from the electrical grid 6, and, on the other hand, supply a flow of outgoing electrical energy to power the radio transceiver 2 and/or the electrical grid 6.

Figure 4:
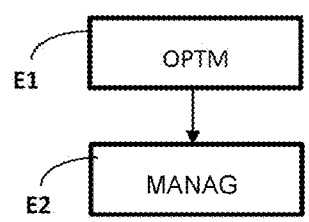
FIG. 4 shows a flow chart of the steps of the management method of the invention according to one particular embodiment.

The control device 100 is intended to control or manage the various flows of electrical energy that have just been described within the radio access system 1 by implementing the method for controlling or managing flows of electrical energy within a radio access system 1 that will now be described with reference to FIG. 4.

The method for controlling flows of electrical energy within a radio access system 1, implemented by the control device 100, aims to manage the flows of energy between the following entities: the base station 2, the electrical energy production device 4, the battery 5 and the electrical grid 6. It is based on a direct management of the battery 5 designed to optimize both an objective function and the life expectancy of the battery 5, as will be explained later.

The operating strategy for the battery 5 (that is to say the charging and discharging strategy or procedure or method for the battery 5) determines the strategy for managing flows of electrical energy between the electrical grid 6 and the radio access system 1 that includes the electrical energy production device 4. Specifically, controlling only the battery 5 is sufficient to define the flows of electrical energy between the components within the radio access system 1 and between the electrical grid 6 and the radio access system 1. This results from the net energy balance in the radio access system 1 between what is 'produced'—by the electrical grid 6 and/or by the local production device 4 and/or, as the case may be, by the battery 5 when the latter is discharging—and what is consumed—by the base station 2 and/or by the electrical grid 6 (electrical energy is sold to the electrical grid 6) and, as the case may be, by the battery 5 when the latter is charging.

The management of the battery 5 is dependent on an optimization operation E1 consisting in optimizing an objective function while respecting one or more constraints relating to the battery 5 and intended to protect the latter against excessively fast (that is to say premature or accelerated) ageing.

In terms of mathematical optimization, an objective function is a function that serves as a criterion to determine the best solution to an optimization problem. It associates a value with an instance of an optimization problem. In the context of the invention, the objective function associates a cost with an operating strategy (or charging and discharging strategy) for the battery 5 during a determined duration T.

The term 'cost' is intended to refer to an expense that is linked with the operation of the radio access system 1, or GSC system, during the determined duration T. This may be an energy (economic) or ecological (environmental) cost. For example, the expense is either the price of electricity purchased from the electrical grid 6 by the radio access system 1, or the carbon footprint (that is to say the amount of $CO_2$ emitted) of the radio access system 1, incurred by an operating strategy for the battery 5.

The operating strategy for the battery 5 during a determined period T may be defined, at each instant t of this period T, by an electric power $P_{batt}$ of the battery 5. At an instant t, this electric power $P_{batt}$ is either positive, when it corresponds to an electric power consumed by the battery 5 (that is to say when the battery is charging and receives an incoming flow of electrical energy), or negative, when it corresponds to an electric power produced by the battery 5 (that is to say when the battery is discharging and supplies an outgoing flow of electrical energy), or zero if the battery is resting. The goal of the optimization is to find an optimum operating (that is to say charging and discharging) strategy for the battery 5 that minimizes the cost.

In a general manner, the control device 100 interacts with an environment comprising the radio access system 1 and the smart electrical grid 6, the state of which at the instant t may be represented by the state vector $s_t$. This state vector $s_t$ groups together state variables corresponding to the energy consumed by the base station 2, the energy produced by the photovoltaic device 4, the state of charge SOC(t) of the battery 5 and the price of electricity $P_e(t)$. At each instant t, the control device 100 selects an action $a_t$ corresponding to a charge or discharge setpoint of the battery 5. The goal is to optimize an objective function O capable of determining, over the long term, a cost linked with the operation of the radio access system 1 while maximizing the lifetime of the battery 5.

The set of environmental states perceived by the control device 100 may be described in the following manner:

$$S = B \times E \times R \times P$$

where
B, E, R and P are sets composed of elements consisting of scalars, relating to the electric power consumed by the base station 2, to the state of charge of the battery 5, to the electric power produced by the photovoltaic device 4 and to the price of electricity on the electrical grid 6, respectively;
S is the set consisting of the Cartesian product, or the combination, of the sets B, E, R and P, this set being composed of elements consisting of vectors of size 4.

Given an initial state s e S, the optimization problem to be considered during a determined duration of time is as follows:

$$\text{Find } \pi^* = \text{argmin}_{\pi \in S \times A} O^\pi(s)$$

where A is the set of (positive) rates of charge, (negative) rates of discharge and (zero) resting rates of the battery 5, $\pi$ is a possible strategy for the battery 5 that associates, with each state of the set S, a rate of charge or of discharge or of rest of the set A, that is to say a charging or discharging or resting action of the battery 5, and $O^\pi(s)$ represents the value of the overall optimization objective for the strategy $\pi$, starting from a state s.

In a first exemplary embodiment, the objective function O associates a price of electricity on the electrical grid 6 with an operating strategy $\pi$ for the battery 5 during a determined period or duration T. This objective function O may be defined by the following equation (1):

$$O = \sum_{t=0}^{T} P_e(t) \cdot E_t(t, t+1) \quad (1)$$

where
$E_t(t,t+1)$ represents the amount of electrical energy supplied by the electrical grid 6 to the radio access system 1 during an elementary duration $\Delta_t$, between the instants "t" and "t+1" (with "t+1"=t+$\Delta_t$), this amount of energy $E_t(t,t+1)$ being positive when the radio access system 1 consumes (or purchases) electrical energy on the grid 6, negative when the radio access system 1 supplies (or sells) electrical energy on the grid 6, or zero when the radio access system 1 and the electrical grid 6 do not exchange electrical energy; and
$P_e(t)$ represents the price of electricity on the electrical grid, valid at the instant t and applicable between the instants t and t+1—more particularly $P_e(t)$ represents the purchase price for a consumer from the electrical grid 6 if $E_t(t,t+1)$ is positive (electrical energy purchased on the grid 6), and the sale price of electricity to the electrical grid 6 when $E_t(t,t+1)$ is negative (electrical energy sold to the grid 6).

The elementary duration $\Delta_t$ is advantageously adapted to the rate of evolution or of variation of the environment, which comprises in particular the price of electricity, the production of electrical energy and the consumption of electrical energy. For example, if the price of electricity is liable to vary every 30 minutes, the elementary duration $\Delta_t$ may be set at 30 minutes.

Thus, the objective function O as defined by equation (1) integrates over time, over the determined duration T, the product
of a price $P_e(t)$ of electricity of the electrical grid that is applicable during the elementary duration $\Delta_t$, and
the amount of electrical energy $E_t(t,t+1)$ supplied by the electrical grid to the radio access system 1 during this elementary duration $\Delta_t$.

The net energy balance at an instant t in the radio access system 1 between:
the electric power received or produced, which comprises
the positive electric power supplied by the electrical grid 6 to the radio access system 1, that is to say the electric power that the radio access system 1 purchases from the electrical grid 6;
the electric power $P_{PV}(t)$ produced by the production device 4; and
as the case may be, the electric power supplied by the battery 5 when the latter is discharging (that is to say produces an outgoing flow of electrical energy)
and the electric power consumed, which comprises
the negative electric power supplied by the electrical grid 6 to the radio access system 1, that is to say the electric power that the radio access system sells to the electrical grid 6;

the electric power consumed by the base station 2; and as the case may be, the electric power consumed by the battery 5 when the latter is charging (that is to say receives an incoming flow of electrical energy)

may be expressed by the following equation (2):

$$\frac{E_t(t, t+1)}{\Delta_t} + P_{PV}(t) = P_{BS}(t) + P_{Bat}((SOC(t), SOC(t+1))) \quad (2)$$

where $\frac{E_t(t, t+1)}{\Delta_t}$ represents the electric power (positive, negative or zero, as explained above) supplied by the electrical grid 6 to the radio access system 1 at the instant t;

$P_{PV}(t)$ represents the electric power produced by the photovoltaic device 4 at the instant t;

$P_{BS}(t)$ represents the electric power consumed by the base station 2 at the instant t;

$P_{Bat}((SOC(t),SOC(t+1)))$ represents the electric power consumed (if it is positive, meaning that the battery 5 is charging) or produced (if it is negative, meaning that the battery 5 is discharging) by the battery 5 at the instant t, this power being zero when the battery is resting;

SOC(t) and SOC(t+1) represent the states of charge of the battery 5 at the instants t and t+1, respectively.

The following equation (3) is derived from equation (2):

$$E_t(t,t+1)=[P_{BS}(t)+P_{Bat}(SOC(t),SOC(t+1))-P_{PV}(t)]\times\Delta_t \quad (3)$$

The amount of electrical energy (positive, negative or zero) supplied by the electrical grid 6 to the GSC system 1 between two instants t and t+1 is therefore dependent on the evolution of the state of charge of the battery between these two instants t and t+1, in other words:

$$E_t(t,t+1)=E_t(SOC(t),SOC(t+1)).$$

From the net energy balance in the radio access system 1, it follows that the amount of electrical energy (positive, negative or zero) supplied by the electrical grid 6 during the elementary duration $\Delta_t$, denoted $E_t(t,t+1)$ or $E_t(SOC(t),SOC(t+1))$, is determined by a mathematical operation of adding an amount of electrical energy consumed by the radio transceiver 2 during the elementary duration $\Delta_t$, denoted $P_{BS}(t)\times\Delta_t$, and, if the battery 5 is charging (that is to say receives an incoming flow of electrical energy originating from the production device 4) over the elementary duration $\Delta_t$, an amount of electrical energy charged to the battery 5 during the elementary duration $\Delta_t$ and passing the state of charge of the battery 5 from SOC(t) to SOC(t+1), denoted $P_{Bat}(SOC(t),SOC(t+1))$, and of subtracting an amount of electrical energy produced by the energy production device 4 during the elementary duration $\Delta_t$, denoted $P_{PV}(t)\times\Delta_t$, and, if the battery 5 is discharging over the elementary duration $\Delta_t$ (that is to say delivers an outgoing flow of electrical energy to the base station 2), an amount of electrical energy discharged from the battery 5 and passing the state of charge of the battery 5 from SOC(t) to SOC(t+1), denoted $|P_{Bat}(SOC(t),SOC(t+1))|$.

Taking into account the equality (3), the objective function O, defined by equation (1), may be formulated in an equivalent manner by the following equation (4):

$$O = \sum_{t=0}^{T} P_e(t) \cdot [[P_{BS}(t) + P_{Bat}(SOC(t), SOC(t+1)) - P_{PV}(t)] \times \Delta_t] \quad (4)$$

During the optimization operation E1, the control device 100 seeks to solve the optimization problem consisting in minimizing the objective function O by applying a charging and discharging strategy π for the battery 5 (or operating strategy for the battery 5) during a determined duration T. In other words, it seeks to determine which strategy π from the set of possible charging and discharging strategies π for the battery 5 makes it possible to minimize the value of the objective function O in order thus to determine argminO{π}. Ultimately, the optimization makes it possible to determine the states of charge SOC(t) of the battery 5, at successive instants t, t+1, t+2, . . . , over the time period of duration T ranging from t=0 to T, which make it possible to minimize the objective function O corresponding here to the price of electricity over the period T.

According to the invention, the control device 100 seeks to solve the optimization problem defined above while satisfying at least one constraint for protecting the battery against accelerated ageing.

In a first embodiment of the invention, one constraint for protecting the battery is to impose that the state of charge SOC(t) of the battery 5 at each instant t belongs to a range of permitted values restricted by a lower bound of between 10% and 30%, advantageously between 15% and 25%, and an upper bound of between 75% and 95%, advantageously between 80% and 90%. For example, the constraint to be respected is that the state of charge of the battery is between 20% and 90%, in other words:

20%≤SOC(t)≤90%.

In a second embodiment of the invention, one constraint for protecting the battery is to set a maximum rate of charge and/or rate of discharge of the battery 5. In other words, a maximum charge current and/or a maximum discharge current of the battery 5 are/is set. The set maximum rate of charge and/or discharge may be determined depending on the current state of charge of the battery and/or on the temperature of the battery.

In a third embodiment of the invention, one constraint for protecting the battery 5 is to restrict the duration of disuse of the battery 5 to a predefined maximum duration. The maximum duration of disuse of the battery 5 may be set. As a variant, the control device 100 determines the maximum permitted duration of disuse of the battery 5 depending on the temperature of the battery and/or on the current state of charge of the battery, on the basis of reference data that are stored in memory. This constraint aims to prevent the battery 5 from remaining inactive for an excessive time, as this would have the effect of degrading it, in particular if the external temperature is high.

It is possible to envisage imposing other constraints intended to protect the battery 5 against accelerated ageing, in other words to increase the lifetime of the battery 5.

The control device 100 may perform the optimization operation E1 while respecting one or more constraints for protecting the battery against ageing.

It will be noted that, if the constraints concerning the values of the battery, such as its temperature, its state of charge, its rate of charge and/or discharge, are set, these values must feature in the set of environmental states as state variables of the battery, for the definition of the optimization problem.

To solve the optimization problem defined above, the control device 100 may use any suitable mathematical optimization method.

In a first embodiment, the control device 100 determines, or predicts, the evolution over time—over the period of determined duration T—of the state variables $P_e(t)$, $P_{BS}(t)$, $P_{PV}(t)$ and SOC(t) contained in equation (4), on the basis of previous data on the evolution of these state variables over a past period. If the period T has a duration of one day, i.e. 24 hours, the evolution of the state variables over one day D may be predicted on the basis of the evolution of these state variables over the preceding day D−1. For example, it is considered that the evolution of the state variables $P_e(t)$, $P_{BS}(t)$, $P_{PV}(t)$ and SOC(t) over one day is identical to their evolution over the previous day. It is thus considered that the evolution of the variables $P_e(t)$, $P_{BS}(t)$, $P_{PV}(t)$ over one day is known on the basis of previous data on the evolution of these variables. In this case, the control device 100 may solve the optimization problem by using, for example, interior point optimization methods.

The optimum charging and discharging strategy determined by optimization E1 is then used by the control device 100 to manage the incoming flows of electrical energy into the battery 5 and the outgoing flows of electrical energy from the battery 5 during a step E2 of managing the battery 5.

In a second embodiment, the control device 100 uses a stochastic optimization method intended to solve the optimization problem on the basis of a learning mechanism or process that makes it possible to estimate the evolution of the state variables. Stochastic optimization has the advantage of requiring no model.

Figure 5:
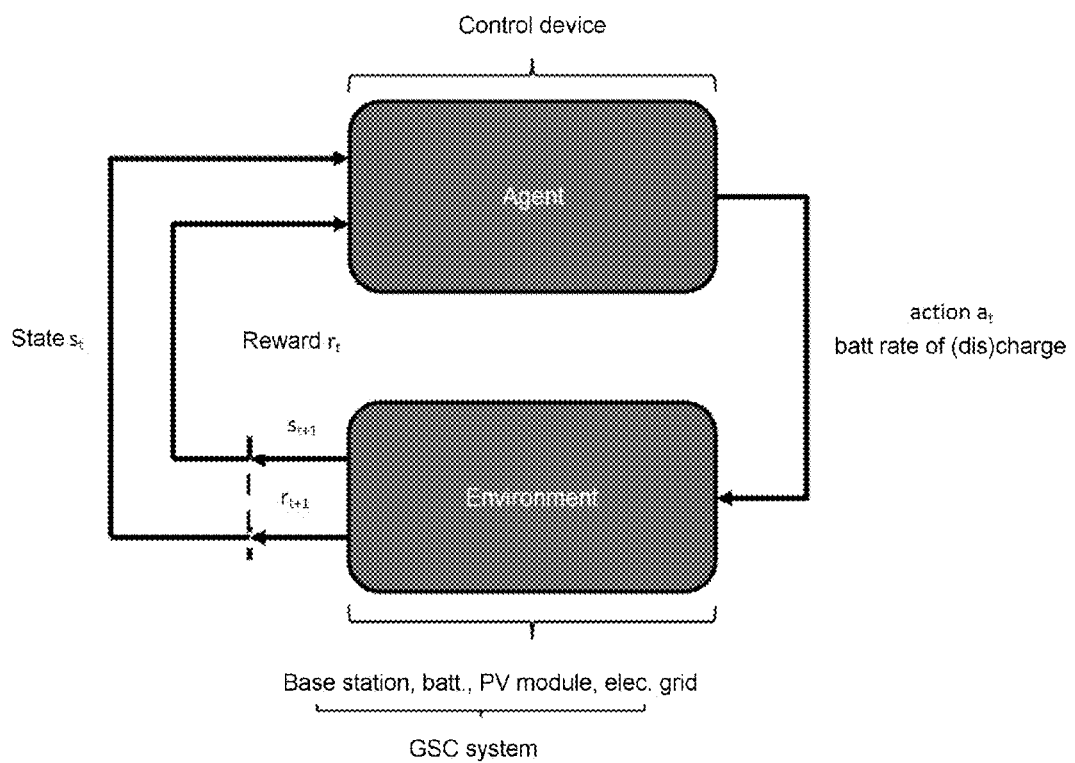
FIG. 5 shows a functional diagram illustrating the interaction between the radio access system, or GSC system, connected to the electrical grid (belonging to the "environment" set) and the control device ("agent").

FIG. 5 shows a functional diagram illustrating an example of a learning mechanism that can be implemented in order to optimize the cost linked with the operation of the radio access system 1 while respecting one or more constraints on the battery aimed at protecting the latter from ageing.

With reference to FIG. 5, an agent, consisting of the control device 100, observes a current state $s_t$ at a current instant t of the environment including the battery 5, the base station 2, the photovoltaic panel 4 and the price of electricity, and consequently chooses an action $a_t$. In response to the chosen action $a_t$, the environment evolves towards a new state $s_{t+1}$ and gives rise to a reward $r_{t+1}$, or a sanction, that the agent seeks to maximize, respectively to minimize, over time. The goal of the agent is therefore to optimize an objective function O by exploiting the rewards and/or the sanctions obtained in order to evaluate the quality of the actions in a given state. The objective function O must represent, over the long term (typically over a period of time corresponding to the theoretical lifetime of the battery), the cost linked with the operation of the radio access system 1, while maximizing the lifetime of the battery 5.

It is possible to make the function $O_\pi(s)$ correspond to the sum of the rewards/sanctions accrued over the course of the application of the strategy π starting from the state s over the long term. It is hence possible to use the Bellman equation as follows:

$$\pi^* = \mathrm{argmin}_{\pi \in S \times A} O^\pi(s) = \mathrm{argmin}_{\pi \in S \times A} \sum_a \sum_{s'} P^a_{s,s'}(R^a_{s,s'} + O^\pi(s'))$$

where:
$R_{s,s'}^a$ is the cost (reward/sanction) associated with selecting the action a in the state s and then accessing the state s'
$P_{s,s'}^a$ is the probability of transitioning from the state s to the state s' by applying the action a, which depends on environmental unknowns (production, consumption and price of energy) and is not known a priori;
$O^\pi(s')$ is the sum of the rewards/sanctions accrued over the course of the application of the strategy η starting from the state s'.

A learning, or Q-learning, algorithm makes it possible to find the optimum value O*(s) and the associated strategy by interacting with the environment, without previous knowledge of $P_{s,s'}^a$. The only conditions are to correctly define $R_{s,s'}^a$ and to sufficiently explore possibilities (state—action) to converge towards the optimum solution.

For example, the immediate cost (reward/sanction), that is to say resulting directly from an action a for passing from the state s to the state s', may be formulated in the following manner:

$$R_{s,s'}^a = (E_{BS}(s) + E_{Bat}(a,s) - E_{PV}(s))P_e(s) + \Gamma_{bat}(s,a,s')$$

where:
$R_{s,s'}^a$ is the immediate cost of selecting an action a in the state s leading to the state s',
$E_{BS}$ is the energy consumed by the base station 2,
$E_{Bat}$ is the energy consumed (if it is positive) or produced (if it is negative) by the battery 5,
$E_{PV}$ is the energy produced by the photovoltaic device 4,
$P_e$ is the price of electricity on the electrical grid 6;
$\Gamma_{bat}$ is the constraint for protecting the battery 5 against accelerated ageing, making it possible to extend the lifetime of the battery 5, this constraint increasing as a recommended operating interval is moved away from.

During the learning, the control device 100 explores various strategies in accordance with the Q-learning algorithm until the optimum strategy that minimizes the long-term cost, that is to say over a period of duration T, is found. The Q-learning algorithm associates, with each state-action pair, a Q-value Q(s,a) that evaluates the impact of the choice of an action a in the state s on the long-term cost. By exploring various actions for various states, the agent collects the rewards/sanctions that it uses to update the Q-values until reaching a balance (no further Q-value is changed).

The control device 100 thus makes it possible to optimize, without a priori knowledge of the models of the fluctuation of the production, of the consumption and of the price of electrical energy, the long-term cost of a radio access system 1 connected to the electrical grid 6 and the life expectancy of the battery 5. First of all, this control device uses a learning process to find the optimum (charging and discharging) operating strategy.

Once the learning has finished, the matrix of the Q-values is used to determine, in each state, the optimum action to choose, during a step E2 of managing the battery 5.

The control device 100 comprises an optimization module 101 intended to determine an operating strategy for the battery 5 by optimizing an objective function that associates a cost with a possible operating strategy for the battery during a determined duration T while respecting at least one constraint for protecting the battery against accelerated ageing, and a module 102 for managing the battery 5, which module is intended to control the incoming and outgoing flows of electrical energy of the battery 5 depending on the determined operating strategy. The optimization module 101 and the management module 102 are intended to implement the optimization step E1 and the management step E2, respectively.

When a new radio access system is deployed, it may exploit the operating strategies of the neighbouring radio access systems that have already performed the learning process. A new learning method needs to be executed only in the event of notable changes, such as a new base station or battery or local electrical energy production device technology, or else a significant change in the energy market.

In one variant embodiment, the objective function associates a carbon footprint (or more generally ecological footprint) cost with an operating strategy for the battery 5 during a determined duration T. The optimization aims to determine the optimum operating strategy for the battery 5 that minimizes the carbon footprint (or the ecological footprint).

The invention claimed is:

1. Method for managing flows of electrical energy within a radio access system for a communication network including a radio transceiver, a device for connecting to an electrical grid, an electrical energy production device and a battery for storing electrical energy produced by the production device and for electrically powering the radio transceiver, the method comprising:

determining, by a control device, an operating strategy for the battery by optimizing an objective function (O) that associates a cost with a possible operating strategy for the battery that minimizes a price of electricity during a period of determined duration T and while respecting at least one constraint for protecting the battery against accelerated ageing, and managing, by the control device, the incoming and outgoing flows of electrical energy of the battery depending on the determined operating strategy, wherein the objective function (O) is a function that associates a price of electricity of the electrical grid with the possible operating strategy for the battery during the period of determined duration T by integrating over time, over the determined duration T, the product of a price of electricity of the electrical grid that is applicable during an elementary duration $\Delta_t$, and an amount of electrical energy supplied by the electrical grid to the radio access system during the elementary duration $\Delta_t$.

2. Method according to claim 1, wherein one constraint for protecting the battery is to impose that a state of charge of the battery belongs to a permitted range restricted by a lower bound of between 10% and 30% and an upper bound of between 75% and 95%.

3. Method according to claim 2, wherein one constraint for protecting the battery is to set a maximum rate of charge or discharge of the battery.

4. Method according to claim 3, wherein the set maximum rate of charge or discharge is determined depending on a temperature of the battery.

5. Method according to claim 1, wherein one constraint for protecting the battery is to set a maximum rate of charge or discharge of the battery.

6. Method according to claim 5, wherein the set maximum rate of charge or discharge is determined depending on a temperature of the battery.

7. Method according to claim 6, wherein the set maximum rate of charge or discharge is determined depending on a current state of charge of the battery.

8. Method according to claim 5, wherein the set maximum rate of charge or discharge is determined depending on a current state of charge of the battery.

9. Method according to claim 1, wherein one constraint for protecting the battery is to restrict a duration of disuse of the battery to a predefined maximum duration.

10. Method according to claim 9, wherein the maximum duration of disuse of the battery is determined depending on at least one of (i) a temperature of the battery and (ii) a current state of charge of the battery.

11. Method according to claim 1, wherein the amount of electrical energy supplied by the electrical grid during an elementary duration $\Delta_t$ is determined by a mathematical operation comprising:

adding an amount of electrical energy consumed by the radio transceiver during the elementary duration $\Delta_t$ and an amount of electrical energy charged to the battery during the elementary duration $\Delta_t$, if the battery is charging over the elementary duration $\Delta_t$, and subtracting an amount of electrical energy produced by the energy production device during the elementary duration $\Delta_t$ and an amount of electrical energy discharged from the battery if the battery is discharging over the elementary duration $\Delta_t$.

12. Method according to claim 1, wherein the optimization is based on data on an evolution, over the period of determined duration T, of state variables relating to electrical energy consumed by the radio transceiver, to state of charge of the battery and to a price of electricity on the electrical grid, which is predicted on basis of previous data on the evolution of the state variables over a past period.

13. Method according to claim 12, wherein the optimization uses an interior point method.

14. Method according to claim 1, wherein the objective function O is defined by the equation $$O = \sum_{t=0}^{T} P_e(t) \cdot [[P_{BS}(t) + P_{Bat}(SOC(t), SOC(t+1)) - P_{PV}(t)] \times \Delta_t],$$

t and t+1 represent two successive instants separated by the elementary duration $\Delta_t$;

$P_e(t)$ represents a purchase price for a consumer of electricity supplied by the electrical grid to the radio access system at the instant t, or a sale price of electricity to the electrical grid by the radio access system;

$P_{PV}(t)$ represents a electric power produced by the production device at the instant t;

$P_{BS}(t)$ represents a electric power consumed by the transceiver at the instant t;

$P_{Bat}((SOC(t),SOC(t+1))$ represents a electric power consumed, if it is positive, or produced, if it is negative, by the battery at the instant t;

SOC(t) and SOC(t+1) represent states of charge of the battery at the instants t and t+1, respectively.

15. Method according to claim 1, wherein the optimization uses a stochastic method implementing a learning mechanism.

16. Method according to claim 1, wherein the objective function associates a carbon footprint cost with a possible operating strategy for the battery, during a determined duration T, of the radio access system, and wherein the optimization aims to minimize the carbon footprint over the duration T.

17. Method according to claim 1, wherein one constraint for protecting the battery is to impose that a state of charge of the battery belongs to a permitted range restricted by a lower bound of between 15% and 25% and an upper bound of between 80% and 90%.

18. Control device for a radio access system for a communication network including a radio transceiver, a device for connecting to an electrical grid, an electrical energy production device and a battery for storing electrical energy produced by the production device and for electrically powering the radio transceiver, wherein the control device comprises:
- an optimization module configured to determine an operating strategy for the battery by optimizing an objective function that associates a cost with a possible operating strategy for the battery that minimizes a price of electricity during a determined duration T while respecting at least one constraint for protecting the battery against ageing, and
- a module for managing the battery configured to control the incoming and outgoing flows of electrical energy of the battery depending on the determined operating strategy,
- wherein the objective function (O) is a function that associates a price of electricity of the electrical grid with the possible operating strategy for the battery during the period of determined duration T by integrating over time, over the determined duration T, the product
  - of a price of electricity of the electrical grid that is applicable during an elementary duration $\Delta_t$, and
  - an amount of electrical energy supplied by the electrical grid to the radio access system during the elementary duration $\Delta_t$.

19. Radio access system for the communication network including the radio transceiver, the device for connecting to the electrical grid, the electrical energy production device, the battery for storing electrical energy produced by the production device and for electrically powering the radio transceiver, and the control device according to claim 18.

20. Method for managing flows of electrical energy within a radio access system for a communication network including a radio transceiver, a device for connecting to an electrical grid, an electrical energy production device and a battery for storing electrical energy produced by the production device and for electrically powering the radio transceiver, the method comprising:
- determining, by a control device, an operating strategy for the battery by optimizing an objective function (O) that associates a cost with a possible operating strategy for the battery during a period of determined duration T while respecting at least one constraint for protecting the battery against accelerated ageing, and
- managing, by the control device, incoming and outgoing flows of electrical energy of the battery depending on the determined operating strategy,
- wherein one of the at least one constraint for protecting the battery is to restrict a duration of disuse of the battery to a predefined maximum duration, and
- wherein the maximum duration of disuse of the battery is determined depending on at least one of (i) a temperature of the battery and (ii) a current state of charge of the battery.

21. Control device for a radio access system for a communication network including a radio transceiver, a device for connecting to an electrical grid, an electrical energy production device and a battery for storing electrical energy produced by the production device and for electrically powering the radio transceiver, wherein the control device comprises:
- an optimization module configured to determine an operating strategy for the battery by optimizing an objective function that associates a cost with a possible operating strategy for the battery during a determined duration T while respecting at least one constraint for protecting the battery against ageing, and
- a module for managing the battery configured to control incoming and outgoing flows of electrical energy of the battery depending on the determined operating strategy,
- wherein one of the at least one constraint for protecting the battery is to restrict a duration of disuse of the battery to a predefined maximum duration, and
- wherein the maximum duration of disuse of the battery is determined depending on at least one of (i) a temperature of the battery and (ii) a current state of charge of the battery.

* * * * *